US012599874B2

(12) United States Patent
Chun et al.

(10) Patent No.: US 12,599,874 B2
(45) Date of Patent: Apr. 14, 2026

(54) WASTEWATER TREATMENT SYSTEM AND METHOD FOR SEMICONDUCTOR FABRICATION PROCESS

(71) Applicant: SAMSUNG ELECTRONICS CO., LTD., Suwon-si (KR)

(72) Inventors: Jiwon Chun, Seongnam-si (KR); Jongkeun Yi, Osan-si (KR); Chongmin Chung, Jeonju-si (KR); Kangwoo Cho, Pohang-si (KR); Baekmin Seong, Suwon-si (KR); Minuk Joo, Pohang-si (KR); Kyuwon Hwang, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 827 days.

(21) Appl. No.: 17/737,809

(22) Filed: May 5, 2022

(65) Prior Publication Data

US 2023/0071797 A1     Mar. 9, 2023

(30) Foreign Application Priority Data

Sep. 6, 2021    (KR) ......................... 10-2021-0118678

(51) Int. Cl.
B01D 61/44        (2006.01)
B01D 61/46        (2006.01)
(Continued)

(52) U.S. Cl.
CPC ........... B01D 61/445 (2013.01); B01D 61/44 (2013.01); B01D 61/465 (2022.08);
(Continued)

(58) Field of Classification Search
CPC ............... C02F 1/4693; C02F 2101/38; C02F 2103/346; B01D 61/46;
(Continued)

(56) References Cited

U.S. PATENT DOCUMENTS 4,629,545 A * 12/1986 Mani ......................... C25B 1/16
                                                                    204/534
5,110,432 A     5/1992 Boateng
(Continued)

FOREIGN PATENT DOCUMENTS

CN        201470316 U    5/2010
CN        104445755 A    3/2015
(Continued)

OTHER PUBLICATIONS

Cleveland et al. Dictionary of Energy (Expanded Edition) 2009 p. 313. Elsevier (Year: 2009).*
(Continued)

*Primary Examiner* — Alexander W Keeling
*Assistant Examiner* — Alexander R. Parent
(74) *Attorney, Agent, or Firm* — Wolf, Greenfield & Sacks, P.C.

(57)                    ABSTRACT

Disclosed are wastewater treatment systems and methods for semiconductor fabrication process. The method comprises performing first concentration on wastewater discharged from a semiconductor process chamber, and performing second concentration on concentrated wastewater or at least a portion of the wastewater concentrated by the first concentration. The step of performing the first concentration includes performing in a first electrodialysis apparatus an ion exchange between the wastewater and first treatment water. The step of performing the second concentration includes allowing the concentrated wastewater to circulate in a second electrodialysis apparatus, allowing second treatment water to circulate in the second electrodialysis apparatus, providing a power to an anode and a cathode of the second electrodialysis apparatus to perform an ion exchange between the second treatment water and the concentrated
(Continued)

wastewater, and joining a portion of the concentrated wastewater to the second treatment water.

12 Claims, 13 Drawing Sheets

(51) Int. Cl.

| | |
|---|---|
| *B01D 61/58* | (2006.01) |
| *C02F 1/469* | (2023.01) |
| *C02F 101/38* | (2006.01) |
| *C02F 103/34* | (2006.01) |
| *C23F 1/46* | (2006.01) |

(52) U.S. Cl.

CPC .......... *B01D 61/466* (2022.08); *B01D 61/58* (2013.01); *C02F 1/4693* (2013.01); *C02F 2101/38* (2013.01); *C02F 2103/346* (2013.01); *C02F 2201/46115* (2013.01); *C23F 1/46* (2013.01)

(58) Field of Classification Search

CPC .......... B01D 61/466–468; B01D 61/44; B01D 61/445; B01D 2311/25; B01D 2311/252; B01D 2311/2521; B01D 2311/2523; B01D 61/465; C23F 1/46

USPC .................................. 204/534, 537, 541, 631

See application file for complete search history.

(56) References Cited

U.S. PATENT DOCUMENTS

| | | | | | |
|---|---|---|---|---|---|
| 5,135,626 | A | * | 8/1992 | Mani .................... | B01D 61/445 |
| | | | | | 204/534 |
| 5,645,703 | A | | 7/1997 | Tsai | |
| 5,753,097 | A | * | 5/1998 | Sharifian .............. | B01D 61/445 |
| | | | | | 204/522 |
| 5,853,555 | A | * | 12/1998 | Sharifian .............. | B01D 61/445 |
| | | | | | 204/535 |
| 5,868,916 | A | * | 2/1999 | Moulton .............. | B01D 61/445 |
| | | | | | 204/522 |
| 5,874,204 | A | * | 2/1999 | Sugawara .............. | B01D 61/44 |
| | | | | | 430/398 |
| 6,217,743 | B1 | | 4/2001 | Moulton et al. | |
| 6,770,189 | B2 | * | 8/2004 | Giatti .................... | B01D 61/44 |
| | | | | | 205/703 |
| 9,718,710 | B2 | * | 8/2017 | Hirakawa .............. | B01D 61/44 |

| | | | | | |
|---|---|---|---|---|---|
| 10,125,428 | B2 | | 11/2018 | Barak | |
| 11,298,660 | B2 | | 4/2022 | Liang et al. | |
| 2007/0056847 | A1 | * | 3/2007 | Akahori ................. | B01D 61/52 |
| | | | | | 204/252 |
| 2018/0079663 | A1 | | 3/2018 | Miyamoto et al. | |
| 2021/0340031 | A1 | * | 11/2021 | Liang ................... | B01D 61/423 |

FOREIGN PATENT DOCUMENTS

| | | | | |
|---|---|---|---|---|
| CN | 107032554 | A | 8/2017 | |
| CN | 107200690 | A * | 9/2017 | .......... B01D 61/445 |
| CN | 107376650 | A | 11/2017 | |
| CN | 108706687 | A | 10/2018 | |
| CN | 109761415 | A | 5/2019 | |
| CN | 110357341 | A | 10/2019 | |
| CN | 110665370 | A | 1/2020 | |
| CN | 111954568 | A | 11/2020 | |
| JP | 2000176457 | A | 6/2000 | |
| JP | 3164968 | B2 | 5/2001 | |
| JP | 3914032 | B2 | 5/2007 | |
| JP | 2018533473 | A | 11/2018 | |
| JP | 2018195707 | A | 12/2018 | |
| KR | 100687095 | B1 | 2/2007 | |
| KR | 101046776 | B1 | 7/2011 | |
| KR | 101235887 | B1 | 2/2013 | |
| KR | 101710195 | B1 | 3/2017 | |
| KR | 20190004789 | A | 1/2019 | |
| KR | 20190061523 | A | 6/2019 | |
| KR | 102192071 | B1 | 12/2020 | |

OTHER PUBLICATIONS

Viriginia Semiconductor, Inc. ("Wet-Chemical Etching and Cleaning of Silicon" 2003 verginiasemi.com) (Year: 2003).*

Badruzzaman, Mohammad , et al., "Innovative beneficial reuse of reverse osmosis concentrate using bipolar membrane electrodialysis and electrochlorination processes", Journal of Membrane Science, vol. 326, Issue 2, Jan. 20, 2009, pp. 392-399.

Faucher, Mélanie , et al., "Drastic energy consumption reduction and ecoefficiency improvement of cranberry juice deacidification by electrodialysis with bipolar membranes at semi-industrial scale: Reuse of the recovery solution", Journal of Membrane Science, vol. 555, Jun. 1, 2018, pp. 105-114.

Wang, Yaoming , et al., "Electrodialysis Process for the Recycling and Concentrating of Tetramethylammonium Hydroxide (TMAH) from Photoresist Developer Wastewater", Industrial & Engineering Chemistry Research, vol. 52, Nov. 29, 2013, pp. 18356-18361.

* cited by examiner

WASTEWATER TREATMENT SYSTEM AND METHOD FOR SEMICONDUCTOR FABRICATION PROCESS

CROSS-REFERENCE TO RELATED APPLICATION

This U.S. nonprovisional application claims priority under 35 U.S.C. § 119 to Korean Patent Application No. 10-2021-0118678 filed on Sep. 6, 2021 in the Korean Intellectual Property Office, the disclosure of which is hereby incorporated by reference in its entirety.

BACKGROUND

The present inventive concepts relate to wastewater treatment systems and methods for semiconductor fabrication processes.

Various processes may be performed to fabricate a semiconductor device. For example, a semiconductor device may be fabricated by performing a photolithography process, an etching process, and a deposition process on a wafer. A photoresist (PR) may be coated on a wafer in a photolithography process. It may be required to remove the photoresist coated on the wafer after a photolithography process. A developer may be used to remove the photoresist coated on the wafer. The developer may include various materials. For example, the developer may include tetramethylammonium hydroxide (TMAH), which may be harmful to humans.

SUMMARY

Example embodiments of the present inventive concepts provide a wastewater treatment system and method for semiconductor fabrication process, which system and method are capable of concentrating a wastewater produced during semiconductor fabrication process.

Example embodiments of the present inventive concepts provide a wastewater treatment system and method for semiconductor fabrication process, which system and method are capable of increasing efficiency of wastewater concentration.

Example embodiments of the present inventive concepts provide a wastewater treatment system and method for semiconductor fabrication process, which system and method are capable of reducing process time and cost.

The object of the present inventive concepts is not limited to the mentioned above, and other objects which have not been mentioned above will be clearly understood to those skilled in the art from the following description.

According to example embodiments of the present inventive concepts, a wastewater treatment method for semiconductor fabrication process may comprise: processing wastewater discharged from a semiconductor process chamber to increase a concentration of a solute in the wastewater, comprising causing an ion exchange between the wastewater and first treatment water in a first electrodialysis apparatus; and processing wastewater that comprises at least a portion of the wastewater with the increased solute concentration, comprising: circulating the wastewater with the increased solute concentration in a second electrodialysis apparatus; circulating second treatment water in the second electrodialysis apparatus; causing an ion exchange between the second treatment water and the wastewater circulating in the second electrodialysis apparatus; and combining a portion of the wastewater circulating in the second electrodialysis apparatus with the second treatment water.

According to example embodiments of the present inventive concepts, a wastewater treatment method for a semiconductor fabrication process may comprise: providing wastewater into a chamber of an electrodialysis apparatus; providing treatment water into the chamber; providing power to an anode and a cathode of the electrodialysis apparatus to cause an ion exchange between the wastewater and the treatment water in the chamber; separating the wastewater discharged from the chamber into reconcentration-target wastewater and additional treatment water; providing the reconcentration-target wastewater into the chamber; and providing both the treatment water discharged from the chamber and the additional treatment water into the chamber.

According to example embodiments of the present inventive concepts, a wastewater treatment system for a semiconductor fabrication process may comprise a first electrodialysis apparatus. The first electrodialysis apparatus may include: a first chamber that provides a wastewater inlet port, a wastewater outlet port, a treatment water inlet port, and a treatment water outlet port; a cathode and an anode in the first chamber; a plurality of ion-exchange membranes in the first chamber; a wastewater tank connected to the wastewater inlet port and the wastewater outlet port; a treatment water tank connected to the treatment water inlet port and the treatment water outlet port; and a connection tube that connects the wastewater outlet port and the treatment water inlet port to each other outside the first chamber.

Details of other example embodiments are included in the description and drawings.

BRIEF DESCRIPTION OF THE DRAWINGS

FIG. 3 illustrates a simplified schematic diagram showing a second electrodialysis apparatus according to example embodiments of the present inventive concepts.

FIG. 4 illustrates a perspective view showing an inside of a chamber in an electrodialysis apparatus according to example embodiments of the present inventive concepts.

DETAILED DESCRIPTION OF EMBODIMENTS

Figure 1:
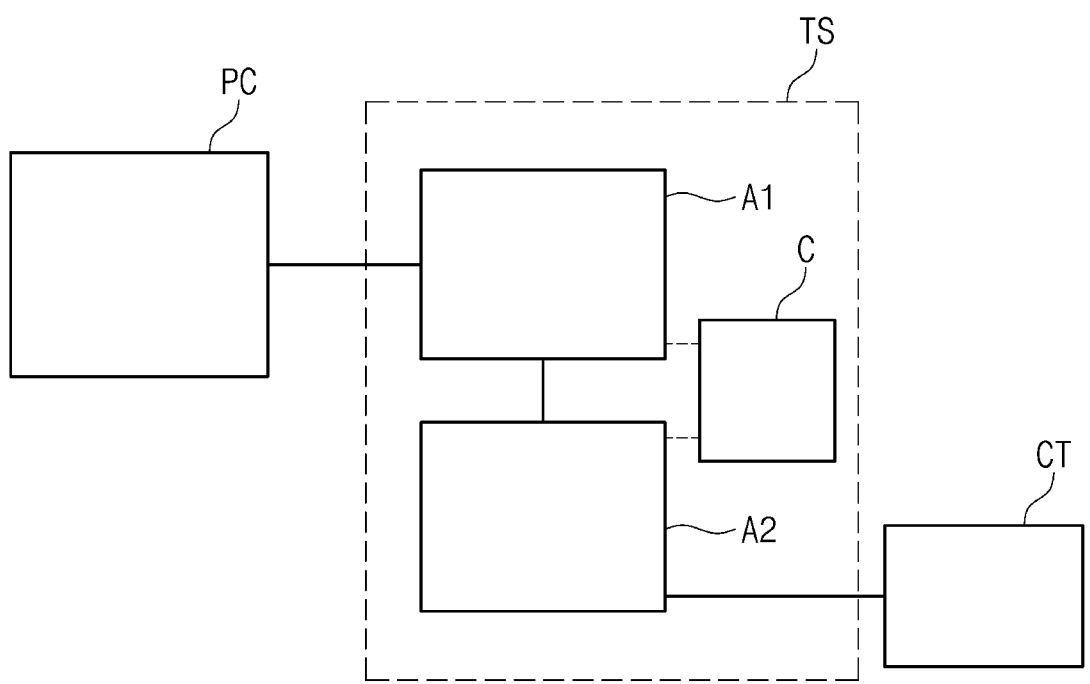
FIG. 1 illustrates a simplified schematic diagram showing a wastewater treatment system for semiconductor fabrication process according to example embodiments of the present inventive concepts.

The following will now describe example embodiments of the present inventive concepts with reference to the accompanying drawings. Like reference numerals may indicate like components throughout the description.

FIG. 1 illustrates a simplified schematic diagram showing a wastewater treatment system for semiconductor fabrication process according to example embodiments of the present inventive concepts.

Referring to FIG. 1, a wastewater treatment system TS for semiconductor fabrication process is illustrated. The wastewater treatment system TS may process wastewater produced in semiconductor fabrication process. For example, the wastewater treatment system TS may process wastewater discharged during an etching process, a photolithography process, and/or a cleaning process. For example, the wastewater treatment system TS may process wastewater discharged when a photoresist (PR) is removed. Therefore, the wastewater may include a developer and the photoresist.

The developer may include tetramethylammonium hydroxide (TMAH). For example, the wastewater treatment system TS may process the wastewater including TMAH. The wastewater treatment system TS may be configured such that a concentration of TMAH in the wastewater is increased to concentrate the wastewater or the TMAH concentration is reduced to dilute the wastewater. It may be possible to reuse a concentrated fluid in which the concentration of TMAH is elevated. For example, the wastewater treatment system TS may be used to recycle TMAH. A fluid in which TMAH concentration is diluted may be discharged. For example, a fluid having a reduced concentration of TMAH may be promptly exhausted to the outside environment. Alternatively, a fluid having a reduced concentration of TMAH may undergo a separate after-treatment and may then be exhausted to the outside environment. For example, the wastewater treatment system TS may be used to discharge fluid after the dilution of TMAH in the fluid. It is explained that the wastewater includes TMAH, and that the wastewater treatment system TS concentrates or dilutes TMAH in the wastewater, but the present inventive concepts are not limited thereto. The wastewater treatment system TS may be used to concentrate or dilute a wastewater with a material (i.e., a solute) other than TMAH.

The wastewater treatment system TS may use electrodialysis (ED) to process the wastewater. To achieve the electrodialysis, the wastewater treatment system TS may include a first electrodialysis apparatus A1, a second electrodialysis apparatus A2, and a controller C.

The first electrodialysis apparatus A1 may receive the wastewater discharged from a process chamber PC. The process chamber PC may permit therein one or more of an etching process, a photolithography process, and a cleaning process. The first electrodialysis apparatus A1 may use electrodialysis to concentrate and/or dilute the wastewater. A fluid discharged from the first electrodialysis apparatus A1 may be introduced into the second electrodialysis apparatus A2.

The second electrodialysis apparatus A2 may receive fluid discharged from the first electrodialysis apparatus A1. For example, the process chamber PC, the first electrodialysis apparatus A1, and the second electrodialysis apparatus A2 may be connected in series. The second electrodialysis apparatus A2 may use electrodialysis to concentrate a fluid (i.e., increase a solute concentration in the fluid) and/or dilute the fluid (i.e., decrease the solute concentration in the fluid) discharged from the first electrodialysis apparatus A1. A fluid discharged with an increased solute concentration from the second electrodialysis apparatus A2 may be stored in a concentration tank CT.

The controller C may control the first electrodialysis apparatus A1 and the second electrodialysis apparatus A2. The controller C may include a memory and a processor. The memory may be an integrated circuit (IC) chip that stores a program, an instruction, and data for performing electrodialysis. Based on the program, the instruction, and the data, the program may generate control signals to control the first electrodialysis apparatus A1 and the second electrodialysis apparatus A2. The controller C may control a duration time of electrodialysis and a flow rate of fluid in each of the first electrodialysis apparatus A1 and the second electrodialysis apparatus A2. A detailed description thereof will be further discussed below. It is explained that one controller C controls both of the first electrodialysis apparatus A1 and the second electrodialysis apparatus A2, but the present inventive concepts are not limited thereto. For example, the first electrodialysis apparatus A1 and the second electrodialysis apparatus A2 may be correspondingly controlled by separate controllers.

Figure 2:
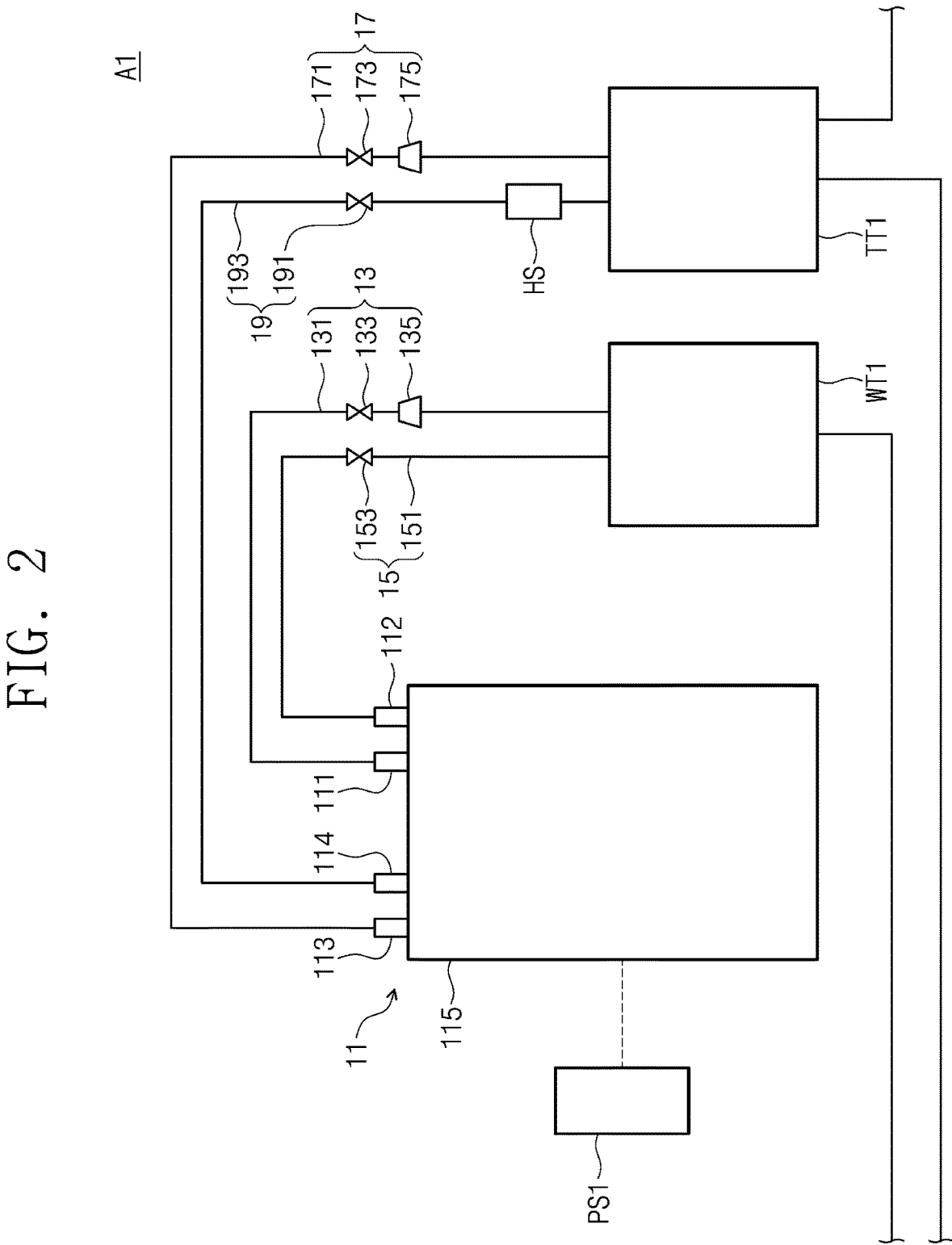
FIG. 2 illustrates a simplified schematic diagram showing a first electrodialysis apparatus according to example embodiments of the present inventive concepts.

FIG. 2 illustrates a simplified schematic diagram showing a first electrodialysis apparatus according to example embodiments of the present inventive concepts.

Referring to FIG. 2, the first electrodialysis apparatus A1 may include a first chamber 11, a first power supply PS1, a first wastewater tank WT1, a first treatment water tank TT1, a first wastewater inlet section 13, a first wastewater outlet section 15, a first treatment water inlet section 17, a first treatment water outlet section 19, and a pH sensor HS.

An electrodialysis process may be performed in the first chamber 11. For example, the first chamber 11 may permit therein an ion exchange between the wastewater and treatment water. The first chamber 11 may include a first wastewater inlet port 111, a first wastewater outlet port 112, a first treatment water inlet port 113, a first treatment water outlet port 114, and a first chamber housing 115.

The first wastewater inlet port 111 may be connected to the first wastewater tank WT1. For example, the first wastewater inlet port 111 may be connected through the first wastewater inlet section 13 to the first wastewater tank WT1. The wastewater in the first wastewater tank WT1 may be introduced into the first chamber housing 115 through the first wastewater inlet section 13 and the first wastewater inlet port 111.

The first wastewater outlet port 112 may be connected to the first wastewater tank WT1. For example, the first wastewater outlet port 112 may be connected through the first wastewater outlet section 15 to the first wastewater tank WT1. The wastewater in the first chamber housing 115 may be introduced back into the first wastewater tank WT1 through the first wastewater outlet port 112 and the first wastewater outlet section 15.

The first treatment water inlet port 113 may be connected to the first treatment water tank TT1. For example, the first treatment water inlet port 113 may be connected through the first treatment water inlet section 17 to the first treatment water tank TT1. The treatment water in the first treatment water tank TT1 may be introduced into the first chamber housing 115 through the first treatment water inlet section 17 and the first treatment water inlet port 113.

The first treatment water outlet port 114 may be connected to the first treatment water tank TT1. For example, the first treatment water outlet port 114 may be connected through the first treatment water outlet section 19 to the first treatment water tank TT1. The first treatment water tank TT1 may receive back treatment water from the first chamber housing 115 through the first treatment water outlet port 114 and the first treatment water outlet section 19.

The first chamber housing 115 may provide a space where an electrodialysis process is performed. The first chamber housing 115 may be provided therein with components for performing an electrodialysis process. A detailed description thereof will be made below with reference to FIG. 4.

The first power supply PS1 may supply the first chamber 11 with power. For example, the first power supply PS1 may provide power to an anode and a cathode in the first chamber 11. Ions in the wastewater and/or the treatment water may move with the power provided from the first power supply PS1.

The first wastewater tank WT1 may store the wastewater. For example, the first wastewater tank WT1 may store the wastewater discharged and transferred from the process chamber PC. The first wastewater tank WT1 may be connected to the process chamber PC. In addition, the first wastewater tank WT1 may provide a fluid storage space. The first wastewater tank WT1 may be connected to the first wastewater inlet port 111 and the first wastewater outlet port 112. The wastewater stored in the first wastewater tank WT1 may be introduced through the first wastewater inlet port 111 to the first chamber 11, and may undergo an ion exchange with the treatment water. The wastewater that has undergone an ion exchange with the treatment water may be introduced back through the first wastewater outlet port 112 into the first wastewater tank WT1. An ion exchange may be performed between the treatment water and the wastewater a certain amount of which repeatedly circulates between the first wastewater tank WT1 and the first chamber 11.

The first treatment water tank TT1 may store the treatment water. For example, the first treatment water tank TT1 may store the treatment water that undergoes an ion exchange with the wastewater. The treatment water used in the first electrodialysis apparatus A1 may be obtained by various ways. For example, the treatment water used in the first electrodialysis apparatus A1 may be obtained due to separation of a portion of fluid discharged from the process chamber PC. For example, treatment water first introduced into the first treatment water tank TT1 may be a fluid including the same material (i.e., solute) as that of the wastewater, and the concentration of the material in the fluid may be the same as that of the concentration of the material in the wastewater. For example, when the wastewater transferred from the process chamber PC to the first wastewater tank WT1 is a fluid composed of water containing TMAH of about 0.85%, the treatment water first introduced into the first treatment water tank TT1 may be a fluid composed of water containing TMAH of about 0.85%. The first treatment water tank TT1 may be connected to the process chamber PC. The present inventive concepts, however, are not limited thereto, and the treatment water may be obtained by different ways. The first treatment water tank TT1 may provide a fluid storage space. The first treatment water tank TT1 may be connected to the first treatment water inlet port 113 and the first treatment water outlet port 114. The treatment water stored in the first treatment water tank TT1 may be introduced through the first treatment water inlet port 113 to the first chamber 11, and may undergo an ion exchange with the wastewater. The treatment water that has undergone the ion exchange with the wastewater may be introduced back through the first treatment water outlet port 114 into the first treatment water tank TT1. The ion exchange may be performed between the wastewater and the treatment water a certain amount of which repeatedly circulates between the first treatment water tank TT1 and the first chamber 11.

The first wastewater inlet section 13 may connect the first wastewater tank WT1 to the first wastewater inlet port 111.

The first wastewater inlet section 13 may include a first wastewater inlet tube 131, a first wastewater inlet valve 133, and a first wastewater inlet pump 135. The first wastewater inlet tube 131 may be a line that connects the first wastewater tank WT1 to the first wastewater inlet port 111. The first wastewater inlet valve 133 may control a wastewater stream in the first wastewater inlet tube 131. The first wastewater inlet valve 133 may be opened or closed to control a flow rate of the wastewater that flows through the first wastewater inlet tube 131. The first wastewater pump 135 may provide a flow force for the wastewater to circulate between the first wastewater tank WT1 and the first chamber 11. The controller (see C of FIG. 1) may control the first wastewater inlet valve 133 and the first wastewater pump 135.

The first wastewater outlet section 15 may connect the first wastewater tank WT1 to the first wastewater outlet port 112. The first wastewater outlet section 15 may include a first wastewater outlet tube 151 and a first wastewater outlet valve 153. The first wastewater outlet tube 151 may be a line that connects the first wastewater tank WT1 to the first wastewater outlet port 112. The first wastewater outlet valve 153 may control a wastewater stream in the first wastewater outlet tube 151. The first wastewater outlet valve 153 may be opened or closed to control a flow rate of the wastewater that flows through the first wastewater outlet tube 151. The controller (see C of FIG. 1) may control the first wastewater outlet valve 153. It is explained that the first wastewater pump 135 is provided in the first wastewater inlet section 13, but the present inventive concepts are not limited thereto. For example, the first wastewater pump 135 may be provided at the first wastewater outlet section 15 or another position.

The first treatment water inlet section 17 may connect the first treatment water tank TT1 to the first treatment water inlet port 113. The first treatment water inlet section 17 may include a first treatment water inlet tube 171, a first treatment water inlet valve 173, and a first treatment water pump 175. The first treatment water inlet tube 171 may be a line that connects the first treatment water tank TT1 to the first treatment water inlet port 113. The first treatment water inlet valve 173 may control a treatment water stream in the first treatment water inlet tube 171. The first treatment water inlet valve 173 may be opened or closed to control a flow rate of the treatment water that flows through the first treatment water inlet tube 171. The first treatment water pump 175 may provide a flow force for the treatment water to circulate between the first treatment water tank TT1 and the first chamber 11. The controller (see C of FIG. 1) may control the first treatment water inlet valve 173 and the first treatment water pump 175.

The first treatment water outlet section 19 may connect the first treatment water tank TT1 to the first treatment water outlet port 114. The first treatment water outlet section 19 may include a first treatment water outlet tube 193 and a first treatment water outlet valve 191. The first treatment water outlet tube 193 may be a line that connects the first treatment water tank TT1 to the first treatment water outlet port 114. The first treatment water outlet valve 191 may control a treatment water stream in the first treatment water outlet tube 193. The first treatment water outlet valve 191 may be opened or closed to control a flow rate of the treatment water that flows through the first treatment water outlet tube 193. The controller (see C of FIG. 1) may control the first treatment water outlet valve 191. It is explained that the first treatment water pump 175 is provided in the first treatment water inlet section 17, but the present inventive concepts are not limited thereto. For example, the first treatment water pump 175 may be provided at the first treatment water outlet section 19 or another position.

The pH sensor HS may measure pH of the treatment water. The pH sensor HS may be provided at the first treatment water outlet section 19. The present inventive concepts, however, are not limited thereto, and the first chamber 11 may have the pH sensor HS positioned at a space where the treatment water passes through. Alternatively, the pH sensor HS may be positioned at the first treatment water tank TT1 or the first treatment water inlet section 17. The pH sensor HS may include a configuration to measure pH of the treatment water. For example, the pH sensor HS may include a potentiometric PH meter. The present inventive concepts, however, are not limited thereto, and the pH sensor HS may indicate a different type of meter.

Figure 3:
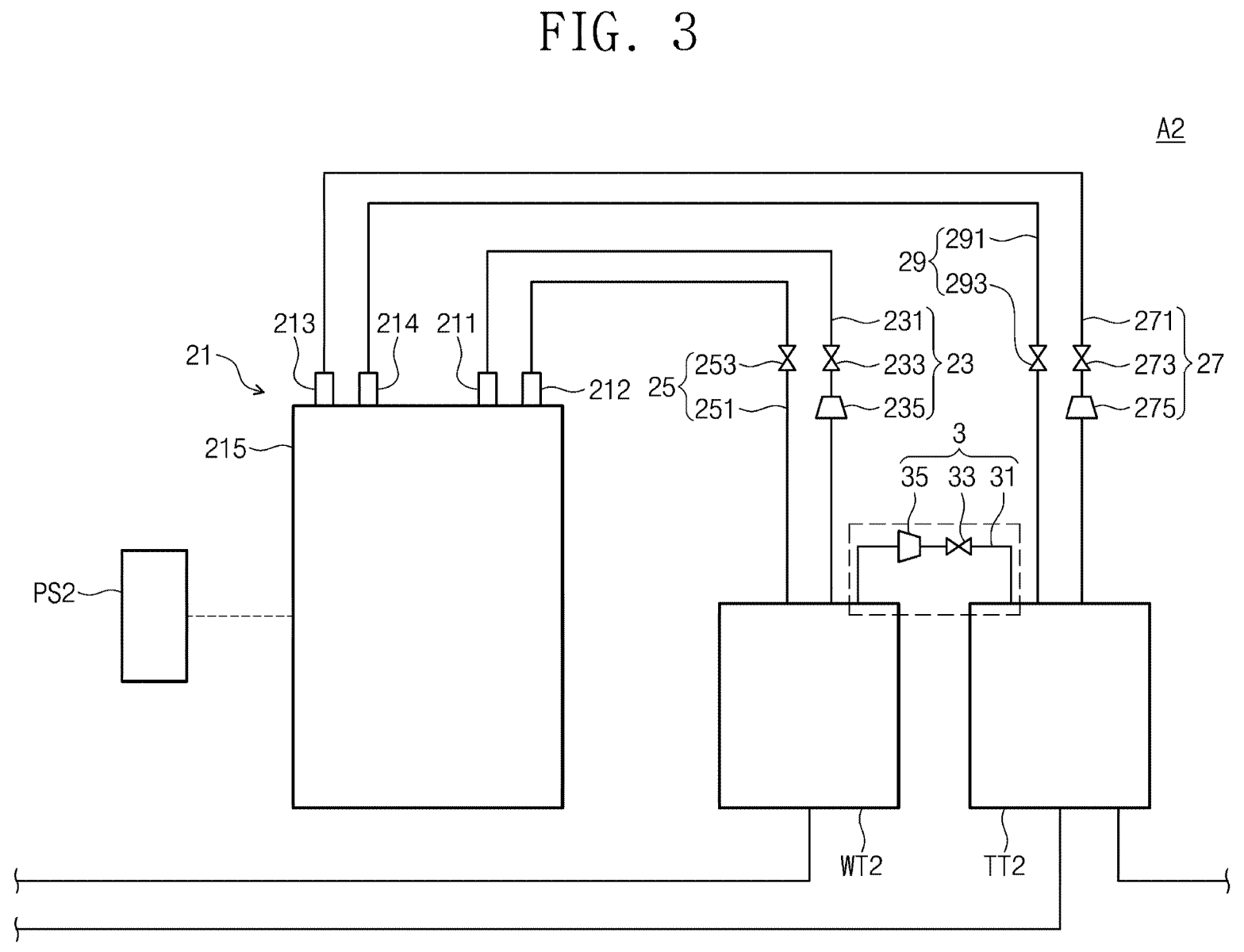

FIG. 3 illustrates a simplified schematic diagram showing a second electrodialysis apparatus according to example embodiments of the present inventive concepts.

Referring to FIG. 3, the second electrodialysis apparatus A2 may include a second chamber 21, a second power supply PS2, a second wastewater tank WT2, a second treatment water tank TT2, a second wastewater inlet section 23, a second wastewater outlet section 25, a second treatment water inlet section 27, a second treatment water outlet section 29, and a connection section 3.

The second chamber 21, the second power supply PS2, the second wastewater tank WT2, the second treatment water tank TT2, the second wastewater inlet section 23, the second wastewater outlet section 25, the second treatment water inlet section 27, and the second treatment water outlet section 29 may respectively correspond to the first chamber 11, the first power supply PS1, the first wastewater tank WT1, the first treatment water tank TT1, the first wastewater inlet section 13, the first wastewater outlet section 15, the first treatment water inlet section 17, and the first treatment water outlet section 19 that are discussed with reference to FIG. 2. Among configurations of FIG. 3, ones that correspond to those of FIG. 3 may be substantially the same as or similar to the configurations of FIG. 2.

For example, similar to the first chamber (see 11 of FIG. 2), the second chamber 21 may include a second wastewater inlet port 211, a second wastewater outlet port 212, a second treatment water inlet port 213, a second treatment water outlet port 214, and a second chamber housing 215.

In addition, the second wastewater inlet section 23 may include a second wastewater inlet tube 231, a second wastewater inlet valve 233, and a second wastewater pump 235.

Moreover, the second treatment water outlet section 29 may include a second treatment water outlet tube 291 and a second treatment water outlet valve 293.

The connection section 3 may connect the second wastewater outlet port 212 and a second treatment water inlet port 213. For example, the connection section 3 may connect the second wastewater outlet port 212 and the second treatment water inlet port 213 to each other outside the second chamber 21, and thus may provide the second treatment water inlet port 213 with a portion of fluid discharged from the second wastewater outlet port 212. The connection section 3 may include a connection tube 31, a connection valve 33, and a connection pump 35.

The connection tube 31 may be a line that connects the second wastewater outlet port 212 to the second treatment water inlet port 213. For example, the connection tube 31 may have one end that is connected to the second wastewater tank WT2 and another end that is connected to the second treatment water tank TT2. For example, the connection tube 31 may be connected through the second wastewater tank WT2 and the second treatment water tank TT2 to the second wastewater outlet port 212 and the second treatment water inlet port 213. Therefore, a portion of fluid discharged from the second wastewater outlet port 212 may travel to the second treatment water inlet port 213 through the second wastewater outlet section 25, the second wastewater tank WT2, the connection section 3, the second treatment water tank TT2, and the second treatment water inlet section 27. The present inventive concepts, however, are not limited thereto, and the second wastewater outlet port 212 and the second treatment water inlet port 213 may be connected to each other through the connection tube 31 in a different way from that shown in FIG. 3. For example, the connection tube 31 may directly connect the second wastewater outlet tube 251 to the second treatment water inlet tube 271. For another example, the connection tube 31 may directly connect the second wastewater outlet tube 251 to the second treatment water tank TT2. For another example, the connection tube 31 may directly connect the second wastewater tank WT2 to the second treatment water inlet tube 271. In addition, the connection tube 31 may include a different configuration that directly or indirectly connects the second wastewater outlet port 212 and the second treatment water inlet port 213 to each other outside the second chamber 21.

The connection valve 33 may be positioned at the connection tube 31. The connection valve 33 may control a fluid stream in the connection tube 31. The connection valve 33 may be opened or closed to control a flow rate of fluid that flows through the connection tube 31. The controller (see C of FIG. 1) may control the connection valve 33.

The connection pump 35 may provide a flow force for fluid to circulate in the connection tube 31. The controller (see C of FIG. 1) may control the connection pump 35.

Figure 4:
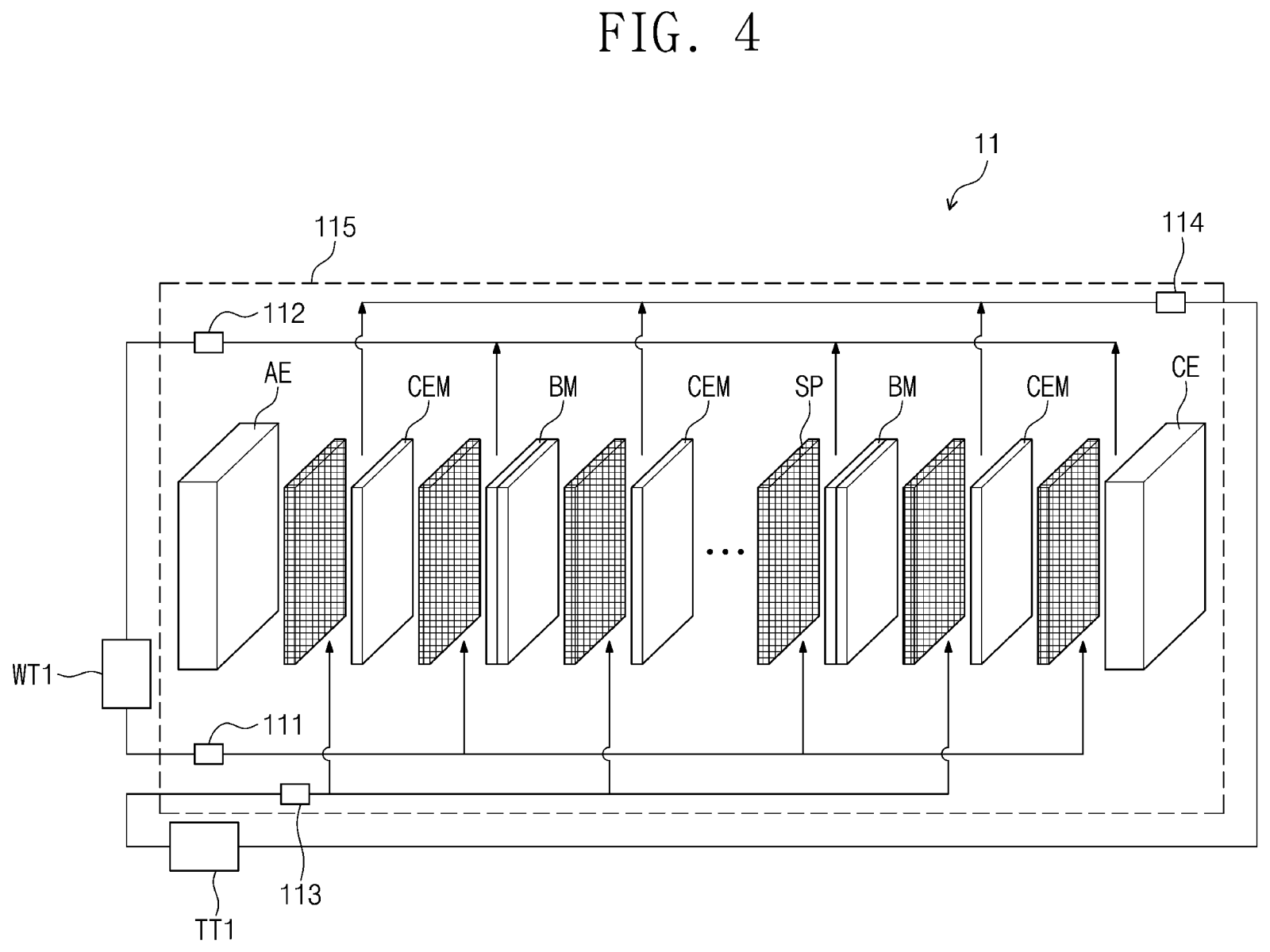

FIG. 4 illustrates a perspective view showing an inside of a chamber in an electrodialysis apparatus according to example embodiments of the present inventive concepts.

Referring to FIG. 4, the first chamber housing 115 may have an anode AE, a cathode CE, an ion-exchange membrane, and a spacer SP that are disposed therein.

The anode AE may receive a power from the first power supply (see PS1 of FIG. 2). The anode AE may have a flat plate shape. The anode AE may include one or more of iridium oxide (IrOx), ruthenium oxide (RuOx), and platinum (Pt) coated with titanium (Ti), but the present inventive concepts are not limited thereto.

The cathode CE may receive a power from the first power supply (see PS1 of FIG. 2). The cathode CE may have a flat plate shape. The cathode CE may be spaced apart from the anode AE. The anode AE and the cathode CE may face each other while being spaced apart from each other. The cathode CE may include one or more of titanium (Ti) and stainless steel (SUS), but the present inventive concepts are not limited thereto.

The ion-exchange membrane may be disposed between the anode AE and the cathode CE. The ion-exchange membrane may be provided in plural (i.e., multiple ion-exchange membranes). The ion-exchange membrane may include a bipolar membrane BM and a cation-exchange membrane CEM. For example, the first electrodialysis apparatus (see A1 of FIG. 2) may be a BP-C type electrodialysis apparatus, which includes a combination of bipolar membrane (BP) and cation-exchange membrane (C).

The bipolar membrane BM may block anions and cations from passing therethrough. For example, anions and cations may all be difficult to pass through the bipolar membrane BM.

The cation-exchange membrane CEM may selectively allow only cations to pass therethrough. For example, only cations may easily pass through the cation-exchange membrane CEM. It may be difficult for anions to pass through the cation-exchange membrane CEM. The cation-exchange membrane CEM may be manufactured based on polystyrene or polyphenylene oxide (PPO) polymer support. For example, the cation-exchange membrane CEM may be made negatively charged by sulfonation of polystyrene or polyphenylene oxide (PPO) polymer support. In this case, a reinforcing fabric may be added to obtain stability to pH.

The bipolar membrane BM and the cation-exchange membrane CEM may be disposed spaced apart from each other between the anode AE and the cathode CE. A spacer SP may be positioned between the bipolar membrane BM and the cation-exchange membrane CEM. The spacer SP may include a porous structure. The spacer SP may include silicon (Si). A structure formed within the spacer SP may allow fluid to flow within the spacer SP.

Each of the bipolar membrane BM and the cation-exchange membrane CEM may be provided in plural. The plurality of bipolar membranes BM may be disposed alternately with the plurality of cation-exchange membranes CEM, as illustrated in FIG. 4. In this case, the spacer SP may also be provided in plural, as illustrated in FIG. 4.

Figure 5:
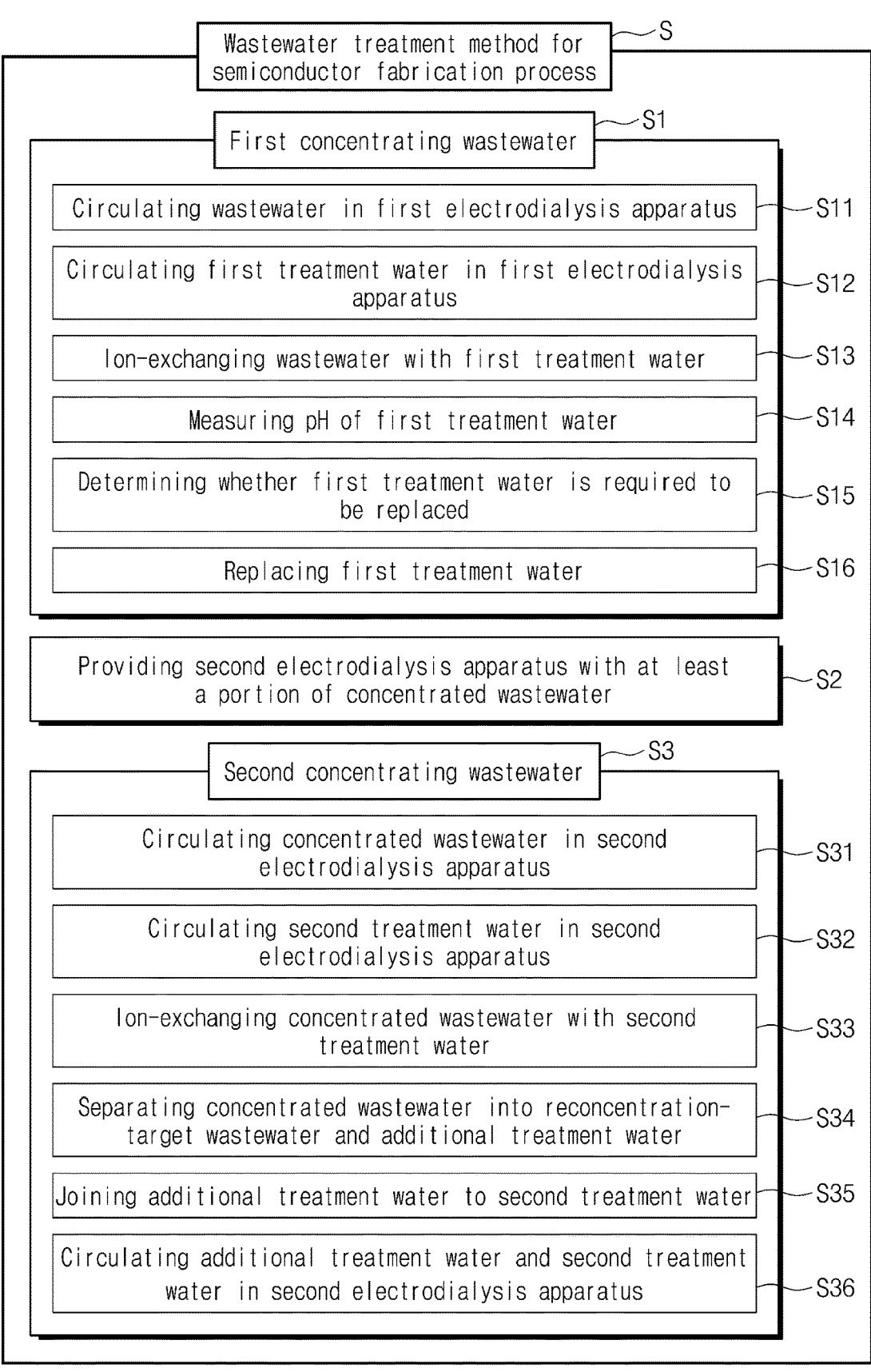
FIG. 5 illustrates a flow chart showing a wastewater treatment method for semiconductor fabrication process according to example embodiments of the present inventive concepts.

FIG. 5 illustrates a flow chart showing a wastewater treatment method for a semiconductor fabrication process according to example embodiments of the present inventive concepts.

Referring to FIG. 5, there may be provided a wastewater treatment method S for a semiconductor fabrication process. The wastewater treatment method S is a method of treating wastewater by using the wastewater treatment system TS discussed with reference to FIG. 1. The wastewater treatment method S may include a step S1 of first concentrating wastewater (i.e., increasing an amount of solute, such as TMAH, within the wastewater), a step S2 of providing a second electrodialysis apparatus with at least a portion of the concentrated wastewater, and a step S3 of second concentrating the wastewater.

The first concentration step S1 may include a step S11 of circulating the wastewater in a first electrodialysis apparatus, a step S12 of circulating a first treatment water in the first electrodialysis apparatus, a step S13 of ion-exchanging the wastewater with the first treatment water, a step S14 of measuring pH of the first treatment water, a step S15 of determining whether the first treatment water is required to be replaced, and a step S16 of replacing the first treatment water.

The second concentration step S3 may include a step S31 of circulating the concentrated wastewater in the second electrodialysis apparatus, a step S32 of circulating a second treatment water in the second electrodialysis apparatus, a step S33 of ion-exchanging the concentrated wastewater with the second treatment water, a step S34 of separating reconcentration-target wastewater into re-concentrated wastewater and additional treatment water, a step S35 of joining the additional treatment water to the second treatment water, and a step S36 of circulating both the additional treatment water and the second treatment water in the second electrodialysis apparatus.

Hereinafter, each step of the wastewater treatment method S of FIG. 5 will be discussed in detail with reference to FIGS. 6 to 9.

FIGS. 6 to 9 illustrate diagrams showing a wastewater treatment method for a semiconductor fabrication process according to the flow chart of FIG. 5.

Figure 6:
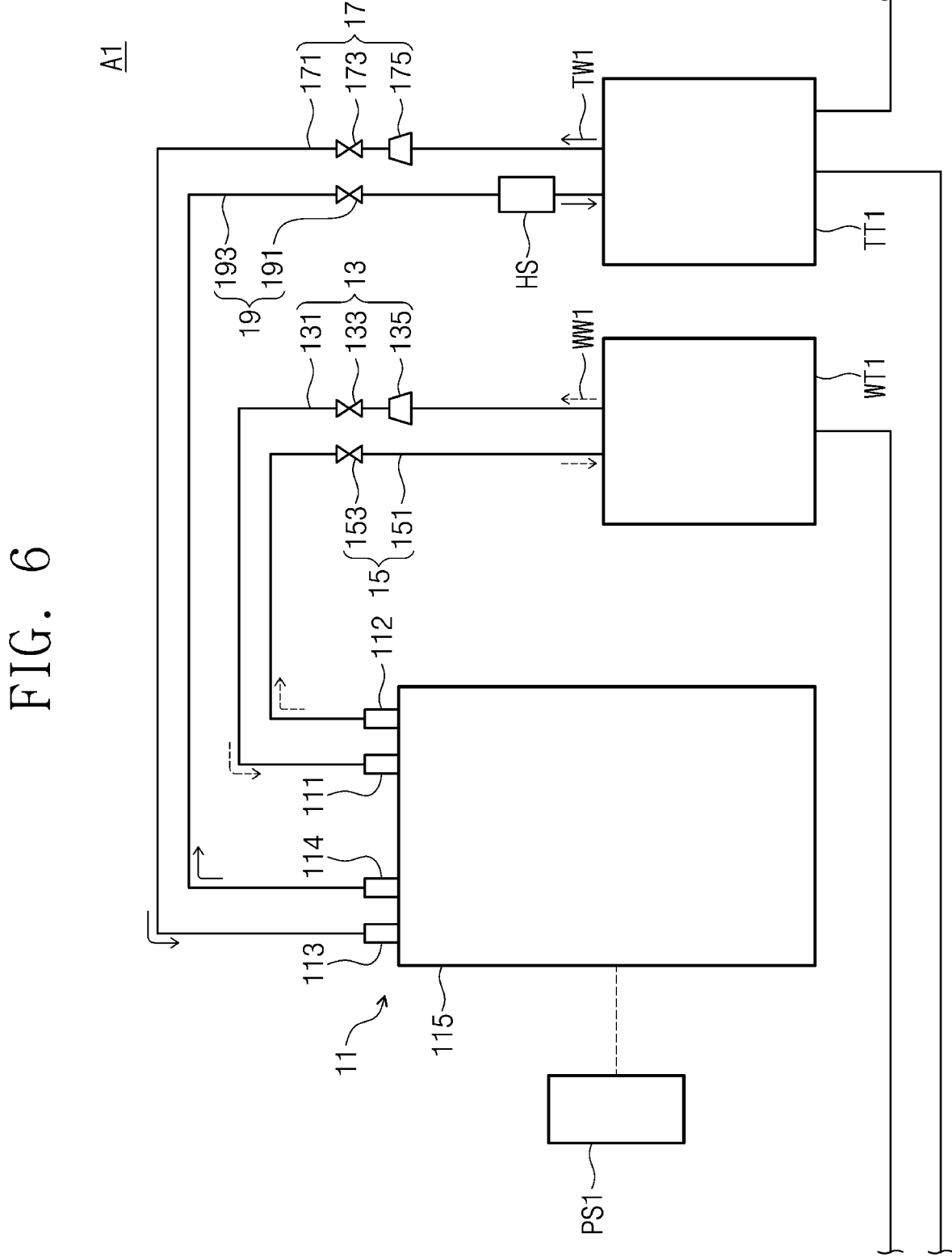
FIGS. 6 to 9 illustrate diagrams showing a wastewater treatment method for semiconductor fabrication process according to the flow chart of FIG. 5.

Referring to FIGS. 5 and 6, the circulation step S11 of the wastewater in the first electrodialysis apparatus may include allowing wastewater WW1 discharged from the process chamber (see PC of FIG. 1) to repeatedly circulate between the first wastewater tank WT1 and the first chamber 11. For example, the wastewater WW1 may sequentially flow through the first wastewater tank WT1, the first wastewater inlet section 13, the first wastewater inlet port 111, the first chamber housing 115, the first wastewater outlet port 112, and the first wastewater outlet section 15. This procedure may be continuously repeated during a certain time.

The circulation step S12 of the first treatment water in the first electrodialysis apparatus may include allowing first treatment water TW1 to repeatedly circulate between the first treatment water tank TT1 and the first chamber 11. For example, the first treatment water TW1 may sequentially flow through the first treatment water tank TT1, the first treatment water inlet section 17, the first treatment water inlet port 113, the first chamber housing 115, the first treatment water outlet port 114, and the first treatment water outlet section 19. This procedure may be continuously repeated during a certain time.

A range of about 1:5 to about 1:9 may be given as a volume ratio between the wastewater WW1 and the first treatment water TW1 that are introduced into the first chamber 11. For example, a range of about 1:7 may be given as the volume ratio between the wastewater WW1 and the first treatment water TW1 that are introduced into the first chamber 11. The present inventive concepts, however, are not limited thereto, and various volume ratios may be given in accordance with detailed designs.

Figure 7:
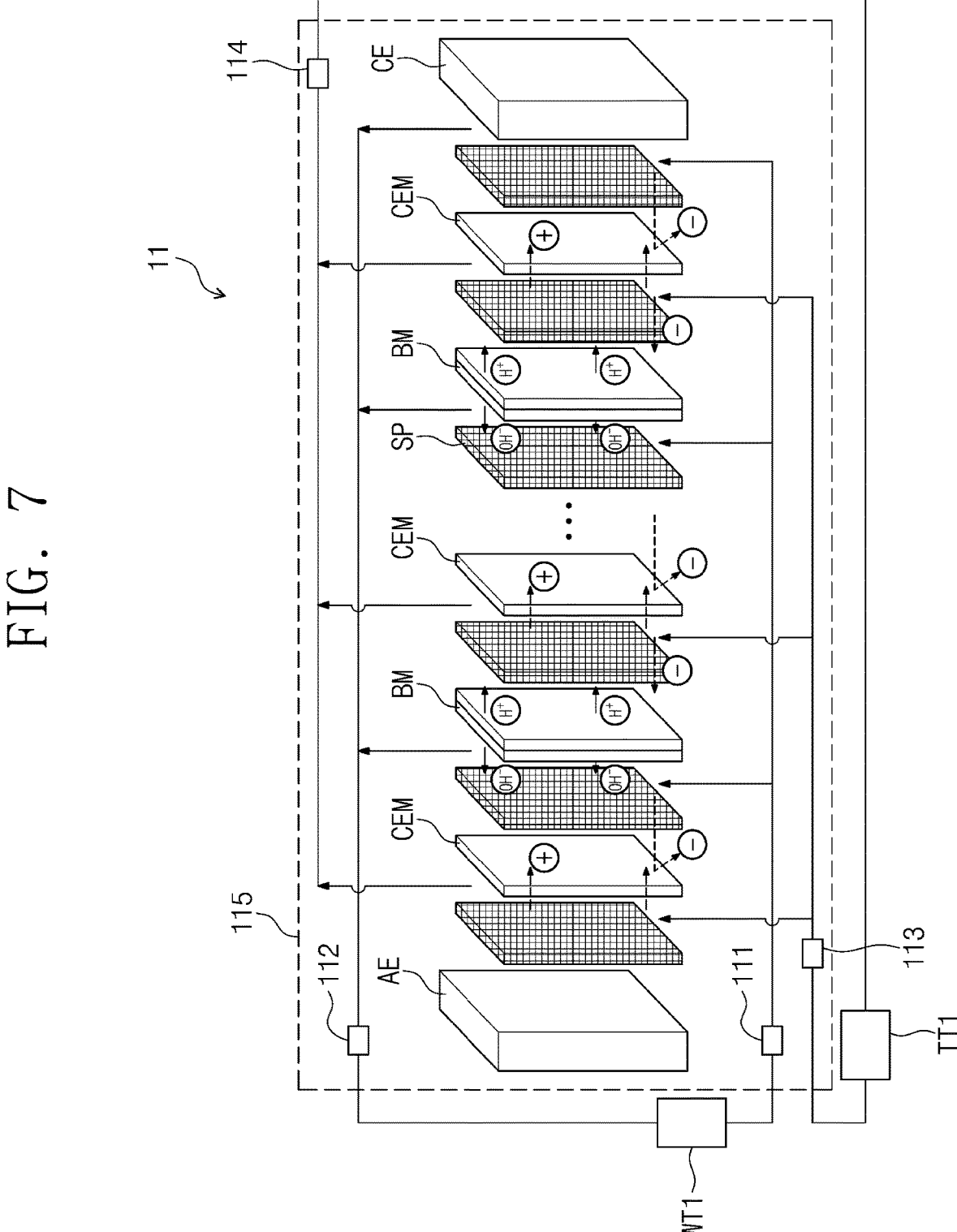

Referring to FIGS. 5 and 7, the ion-exchange step S13 between the wastewater and the first treatment water may include allowing the wastewater and the first treatment water to undergo an ion exchange in the first chamber housing 115. The wastewater discharged from the first wastewater tank WT1 may be introduced into a space between the cation-exchange membrane CEM and the bipolar membrane BM. In this case, the wastewater may be introduced into a space in contact with a surface of the cation-exchange membrane CEM, which surface is directed toward the cathode CE.

In contrast, the first treatment water discharged from the first treatment water tank TT1 may be introduced into a space between the cation-exchange membrane CEM and the bipolar membrane BM. In this case, the first treatment water may be introduced into a space in contact with a surface of the cation-exchange membrane CEM, which surface is directed toward the anode AE.

The anode AE and the cathode CE may be supplied with power from the first power supply (see PS1 of FIG. 2). Therefore, ions may move which are included in the wastewater and the first treatment water in the first chamber housing 115. For example, cations may move toward the cathode CE. In addition, anions may move toward the anode AE. A hydrogen ion (H+) and a hydroxide ion (OH−) may be generated on a surface of the bipolar membrane BM. The hydrogen ion (H+) and the hydroxide ion (OH−) may also move. A cation may pass through the cation-exchange membrane CEM to move toward the cathode CE. However, the cation may not pass through the bipolar membrane BM. In contrast, an anion may pass through none of the cation-exchange membrane CEM and the bipolar membrane BM. Therefore, each of the anion and the cation may aggregate in an isolated space.

When the wastewater includes TMAH, the cation may include a tetramethylammonium cation, TMA+. When the TMA+ is driven to one side, the TMA+ may meet the hydroxide ion (OH−) provided from the bipolar membrane BM, with the result there may be an increase in concentration of TMAH in a fluid present in a space where the TMA+ and OH− meet with each other. The fluid, whose TMAH concentration is increased, may be introduced back to the first wastewater tank WT1 after passing through the first wastewater outlet port 112. In a fluid present in a space where the TMA+ is removed, the TMA+ may be replaced with the hydrogen ion (H+) provided from the bipolar membrane BM, with the result that there may be a reduction in concentration of TMAH. The fluid, whose TMAH concentration is reduced, may be introduced back to the first treatment water tank TT1 after passing through the first treatment water outlet port 114. Therefore, there may be an increase in TMAH concentration in the wastewater and a reduction of TMAH concentration in the first treatment water. Accordingly, the wastewater may be concentrated, and the first treatment water may be diluted.

Referring back to FIGS. 5 and 6, the pH measurement step S14 of the first treatment water may include using the pH sensor HS to measure pH of the first treatment water TW1. When the pH sensor HS is installed on the first treatment water outlet tube 193, the pH sensor HS may measure the pH of the first treatment water TW1 discharged from the first chamber 11.

The determination step S15 of whether the first treatment water requires replacing may include determining whether the pH of the first treatment water TW1 is below a certain value. For example, when the measured pH of the first treatment water TW1 is less than a value preset in the controller (see C of FIG. 1), the controller C may determine that the first treatment water TW1 is required to be replaced.

The replacement step S16 of the first treatment water may include replacing the first treatment water TW1 with new treatment water when the pH of the first treatment water TW1 is equal to or less than a reference value. The first treatment water TW1 circulating in the first electrodialysis apparatus A1 may be exhausted, and new first treatment water may circulate in the first electrodialysis apparatus A1.

Figure 8:
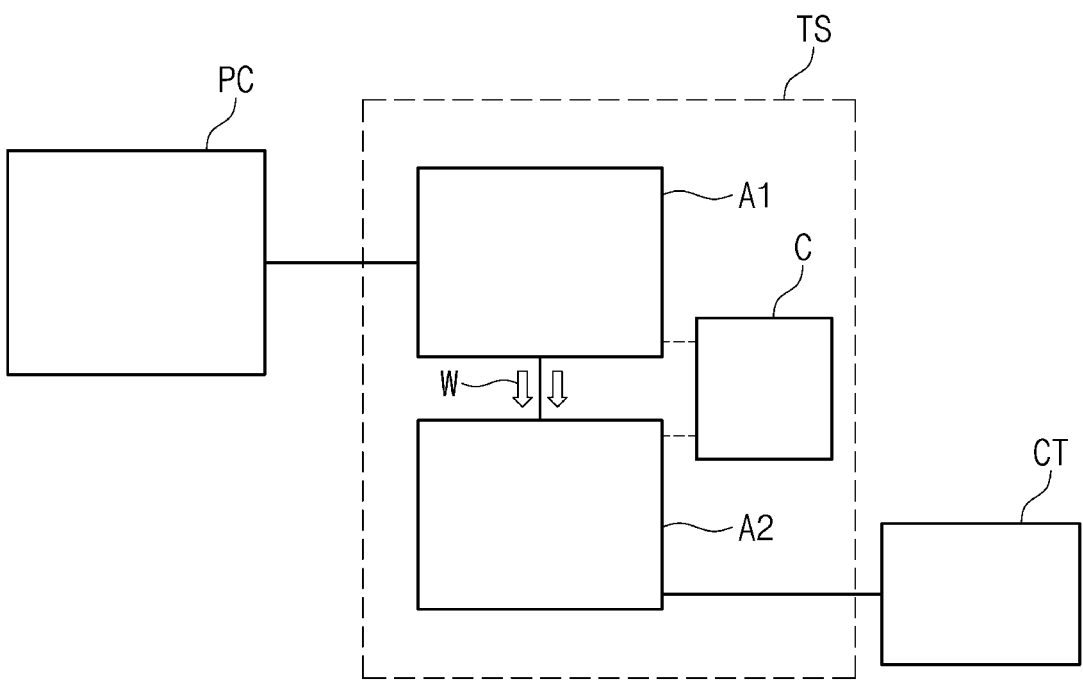

Referring to FIGS. 5 and 8, the delivery step S2 of at least a portion of concentrated wastewater into the second electrodialysis apparatus A2 may include providing the second electrodialysis apparatus A2 with at least a portion W of the wastewater that is concentrated in the first electrodialysis apparatus A1. A portion of the wastewater that is concentrated in the first electrodialysis apparatus A1 may be delivered to the second wastewater tank (see WT2 of FIG. 9). The term "concentrated wastewater" may indicate a fluid delivered to and reconcentrated in the second wastewater tank WT2. The term "residual wastewater" may denote another portion of the wastewater concentrated in the first electrodialysis apparatus A1.

Figure 9:
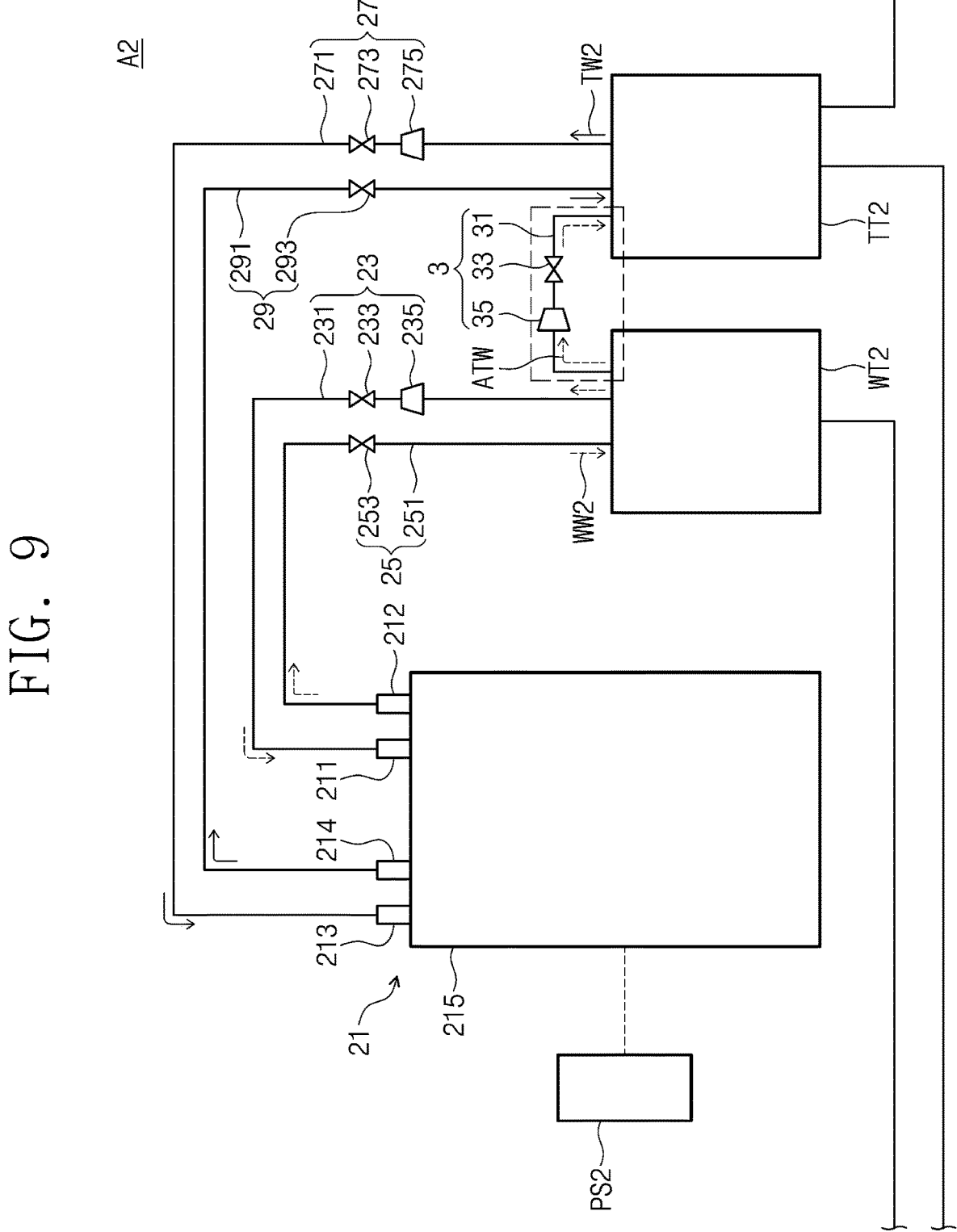

Referring to FIGS. 5 and 9, the circulation step S31 of the concentrated wastewater in the second electrodialysis apparatus may include allowing concentrated wastewater WW2 to repeatedly circulate between the second wastewater tank WT2 and the second chamber 21. For example, the concentrated wastewater WW2 may sequentially flow through the second wastewater tank WT2, the second wastewater inlet section 23, the second wastewater inlet port 211, the second chamber housing 215, the second wastewater outlet port 212, and the second wastewater outlet section 25. This procedure may be continuously repeated during a certain time.

The circulation step S32 of the second treatment water in the second electrodialysis apparatus A2 may include allowing second treatment water TW2 to repeatedly circulate between the second treatment water tank TT2 and the second chamber 21. For example, residual wastewater may be used as the second treatment water TW2. The present inventive concepts, however, are not limited thereto, and water may be used as the second treatment water TW2 or a fluid immediately discharged from the process chamber (see PC of FIG. 1) may be used as the second treatment water TW2. The second treatment water TW2 may sequentially flow through the second treatment water tank TT2, the second treatment water inlet section 27, the second treatment water inlet port 213, the second chamber housing 215, the second treatment water outlet port 214, and the second treatment water outlet section 29. This procedure may be continuously repeated during a certain time.

The ion-exchange step S33 between the concentrated wastewater and the second treatment water may be substantially identical or similar to the ion-exchange step S13, discussed with reference to FIGS. 5 and 7, between the wastewater and the first treatment water. Therefore, the concentrated wastewater WW2 may increase in concentration. In contrast, the second treatment water TW2 may decrease in concentration. For example, the concentrated wastewater WW2 may be concentrated, and the second treatment water TW2 may be diluted.

The separation step S34 of the concentrated wastewater into reconcentration-target wastewater and additional treatment water may include separating a portion of the concentrated wastewater WW2 discharged from the second chamber 21. For example, the concentrated wastewater WW2 discharged from the second wastewater outlet port 212 may be separated into reconcentration-target wastewater and additional treatment water ATW. For example, when the connection tube 31 connects the second wastewater tank WT2 to the second treatment water tank TT2, the connection pump 35 may cause a portion of the concentrated wastewater WW2 to flow through the connection tube 31 from the second wastewater tank WT2. The additional treatment water ATW may indicate a fluid that flows to the connection tube 31. The reconcentration-target wastewater may denote a fluid that remains without being separated into the additional treatment water ATW. The additional treatment water ATW separated from the concentrated wastewater WW2 may have a volume less than that of the reconcentration-target wastewater. A flow stream and a flow rate of the additional treatment water ATW may be adjusted by allowing the controller (see C of FIG. 1) to control the connection valve 33 and/or the connection pump 35. A way of separation of the additional treatment water ATW from the concentrated wastewater WW2 may depend on how the connection tube 31 is connected.

The joining step S35 of the additional treatment water to the second treatment water may including allowing the second treatment water TW2 to receive the separated additional treatment water ATW that flows to the connection tube 31. For example, when the connection tube 31 connects the second wastewater tank WT2 to the second treatment water tank TT2, the separated additional treatment water ATW may flow to the second treatment water tank TT2. For example, the additional treatment water ATW may flow along the connection tube 31, and thus the additional treatment water ATW and the second treatment water TW2 may join each other in the second treatment water tank TT2. The additional treatment water ATW may be a fluid discharged after being concentrated during a certain time in the second chamber 21. Therefore, there may be an increase in overall concentration of the second treatment water TW2 to which the additional treatment water ATW is joined. In addition, there may be an increase in overall volume of the second treatment water TW2 to which the additional treatment water ATW is joined.

The circulation step S36 of both the additional treatment water ATW and the second treatment water TW2 in the second electrodialysis apparatus A2 may include allowing the additional treatment water ATW, which is joined to the second treatment water TW2, to continuously circulate along the second treatment water inlet section 27, the second treatment water inlet port 213, the second chamber housing 215, and the second treatment water outlet section 29. The second treatment water TW2 to which the additional treatment water ATW is joined may concentrate the concentrated wastewater WW2 in the second chamber 21. Therefore, it may be possible to dilute the second treatment water TW2 to which the additional treatment water ATW.

Figure 10:
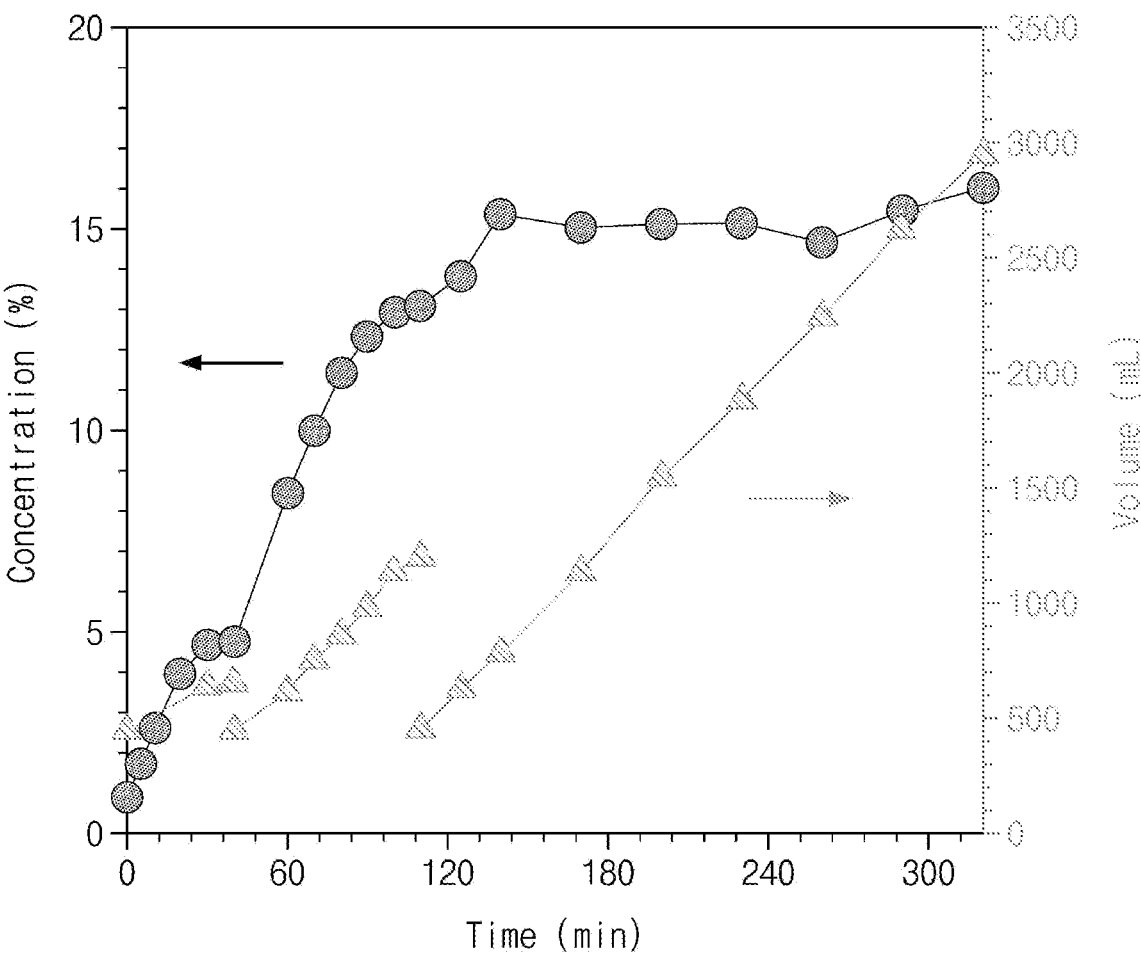
FIG. 10 illustrates a graph showing how wastewater concentration and volume vary with concentration time.

FIG. 10 illustrates a graph showing how wastewater concentration and volume vary with concentration time.

Referring to FIG. 10, differently from that discussed with reference to FIG. 5, there may be provided results obtained by performing three-step concentration, not two-step concentration. A horizontal axis may indicate a concentration time. A left vertical axis may denote a concentration value. A right vertical axis may denote a volume value of concentrated wastewater. In the graph, circles may mean concentration values on the left vertical axis. In the graph, triangles may mean volume values on the right vertical axis. In the graph, divided three groups of triangles may indicate that concentration is performed at three steps.

The longer the concentration time, the higher the concentration of the wastewater, as illustrated. In addition, the longer the concentration time, the higher the volume of the wastewater, as illustrated.

For example, the concentration of wastewater may be about 4% to about 5% at a termination time of one-step concentration. In addition, the volume of wastewater may be about 600 mL at a termination time of one-step concentration.

Moreover, the concentration of wastewater may be about 13% at a termination time of two-step concentration. In addition, the volume of wastewater may be about 1200 mL at a termination time of two-step concentration.

Furthermore, the concentration of wastewater may be about 16% at a termination time of three-step concentration. In addition, the volume of wastewater may be about 3000 mL at a termination time of three-step concentration.

In the case of the three-step concentration, there may be a small increase in concentration. In contrast, in the case of the three-step concentration, there may be a large increase in volume. For example, because the three-step concentration has a large increase in volume, there may be a relatively small increase in concentration. The graph may indicate that concentration efficiency versus time may be greater for the two-step concentration than for the three-step concentration.

Figure 11:
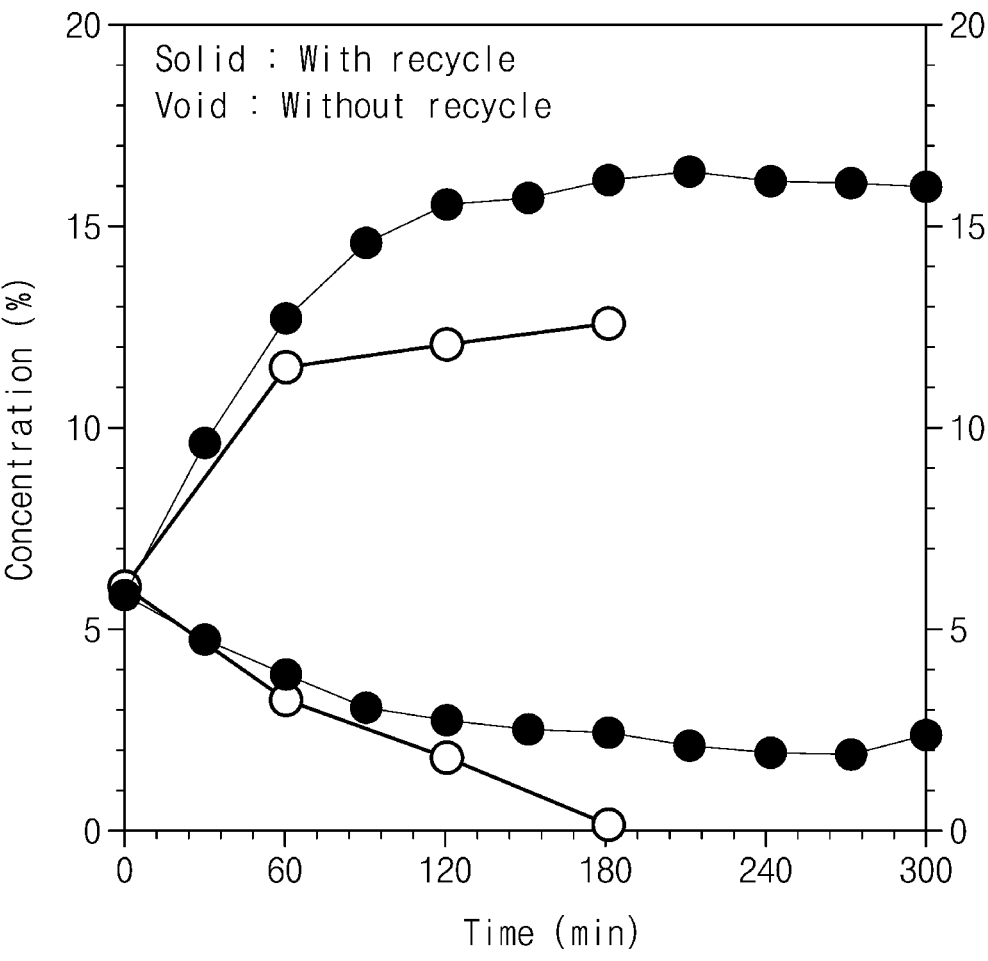
FIG. 11 illustrates a time-concentration graph showing comparison between a case where a portion of wastewater is joined to treatment water in a concentration step and a case where a portion of wastewater is not joined to treatment water in a concentration step.

FIG. 11 illustrates a time-concentration graph showing a comparison between a case in which a portion of wastewater is joined to treatment water in a concentration step and a case in which a portion of wastewater is not joined to treatment water in a concentration step.

FIG. 11 depicts a graph of concentration measured in a case where a portion of wastewater is sent to treatment water in one-step concentration and a case where a portion of wastewater is not sent to treatment water in one-step concentration. In the graph, the expression "recycle" may indicate a mode in which a portion of wastewater is sent to treatment water in a concentration step. A horizontal axis may indicate a concentration time. A vertical axis may denote a concentration value.

In the graph, solid circles may indicate results of recycle modes. In the graph, hollow circles may indicate results of non-recycle modes.

In the graph, an upward trace may denote a concentration value of wastewater. In the graph, a downward trace may denote a concentration value of treatment water.

The longer the concentration time, the higher the concentration of the wastewater, as illustrated. In addition, the longer the concentration time, the lower the concentration of the treatment water, as illustrated.

In the case of the recycle mode, there may be a relatively large increase in concentration of treatment water. In addition, in the case of the recycle mode, there may be a relatively small reduction in concentration of treatment water. In contrast, in the case of the non-recycle mode, there may be a relatively small increase in concentration of wastewater. In addition, in the case of the non-recycle mode, there may be a relatively large reduction in concentration of treatment water. For example, in the case of the recycle mode, the wastewater may be concentrated to higher levels when the same time passes.

Figure 12:
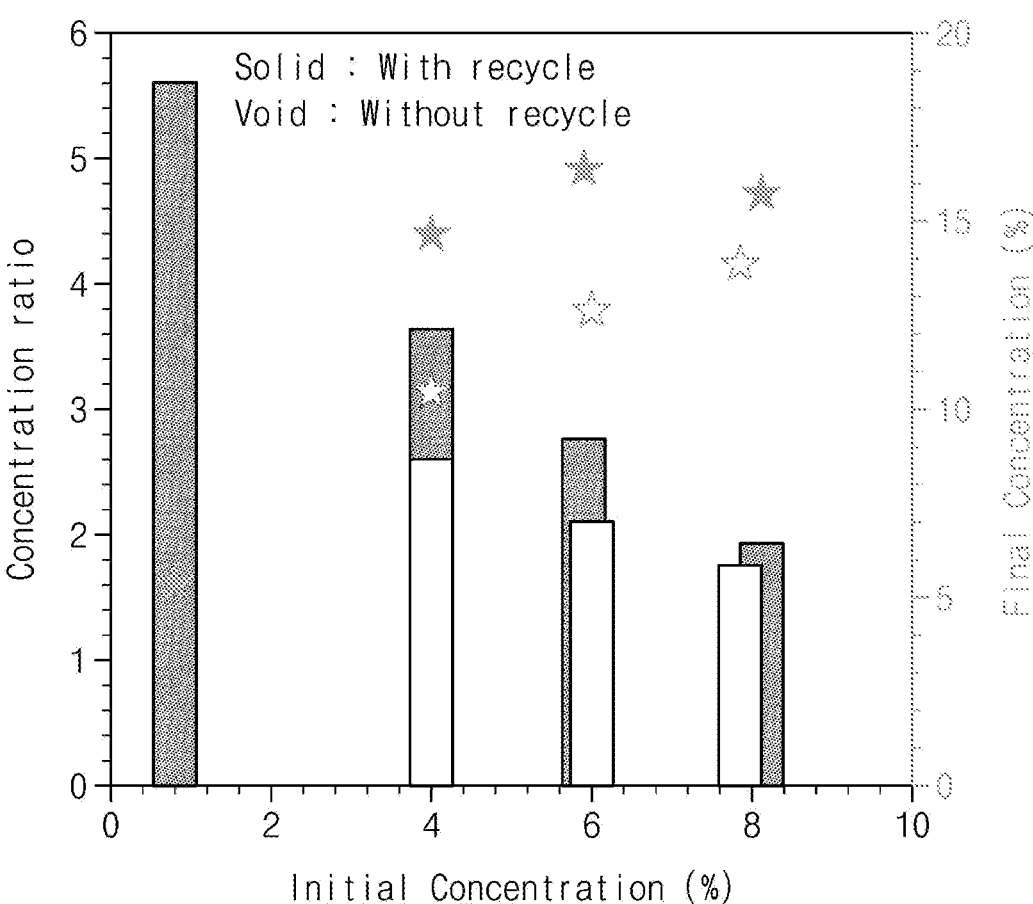
FIG. 12 illustrates a graph showing a concentration ratio at an initial concentration.

FIG. 12 illustrates a graph showing a concentration ratio at an initial concentration.

Referring to FIG. 12, there may be provided a concentration ratio at an initial concentration between a case where a portion of wastewater is sent to treatment water in one-step concentration and a case where a portion of wastewater is not sent to treatment water in one-step concentration.

A horizontal axis may indicate an initial concentration value. A vertical axis may denote a concentration ratio of wastewater.

In a case where the initial concentration of wastewater is less than about 2%, the concentration ratio may be relatively large. In a case where the initial concentration of wastewater is about 4%, the concentration ratio in the recycle mode may be about 4.5. In a case where the initial concentration of wastewater is about 4%, the concentration ratio in the non-recycle mode may be about 3. In a case where the initial concentration of wastewater is about 6%, the concentration ratio in the recycle mode may be about 5. In a case where the initial concentration of wastewater is about 6%, the concentration ratio in the non-recycle mode may be about 3.8. In a case where the initial concentration of wastewater is about 8%, the concentration ratio in the recycle mode may be about 4.8. In a case where the initial concentration of wastewater is about 8%, the concentration ratio in the non-recycle mode may be about 4.2.

The cases of the recycle mode may have higher concentration ratios regardless of the initial concentration. Accordingly, the wastewater may be concentrated to higher levels in the case of the recycle mode.

According to a wastewater treatment system and method for a semiconductor fabrication process in accordance with example embodiments of the present inventive concepts, two-step concentration may be used to highly concentrate wastewater. Therefore, it may be possible to reuse a fluid in which TMAH is highly concentrated. In addition, it may be possible to reduce a concentration of TMAH in a discharged fluid. When residual wastewater is used as treatment water in the two-step concentration, it may be possible to reduce a difference in concentration between the wastewater and the treatment water in the two-step concentration. Therefore, concentration efficiency may increase.

According to a wastewater treatment system and method for a semiconductor fabrication process in accordance with example embodiments of the present inventive concepts, a portion of wastewater that circulates in an electrodialysis apparatus may be separated and joined to treatment water. Therefore, it may be possible to reduce a volume of the circulating wastewater. As an electrodialysis process is performed, there may be a large difference in concentration between the treatment water and the wastewater circulating in the electrodialysis apparatus. Accordingly, the volume of the wastewater may increase due to osmosis pressure. The increase in volume of the wastewater may cause the wastewater to have a relatively lower concentration. When a portion of circulating wastewater is separated and joined to the treatment water, the volume of the wastewater may decrease and as a result the wastewater may increase in concentration. In addition, a portion of circulating wastewater may be joined to the treatment water, and thus the treatment water may increase in concentration. Therefore, even though the electrodialysis process is performed, there may be a less difference in concentration between the wastewater and the treatment water. Thus, the osmosis pressure to the waste may be alleviated. As a result, the wastewater may be concentrated to higher levels.

According to a wastewater treatment system and method for a semiconductor fabrication process in accordance with example embodiments of the present inventive concepts, pH of the treatment water that circulates during the electrodialysis process may be measured, and the treatment water replaced when the pH of the treatment water is less than a certain value. When the pH is significantly reduced, an ion exchange may decrease in energy efficiency. For example, when the pH is significantly reduced, completion may occur between a hydrogen ion and other cation in a cation-exchange membrane, the other cation may be difficult to pass through the cation-exchange membrane. In this case, concentration efficiency may decrease. Therefore, when the pH of the treatment water is less than a certain value, the treatment water may be replaced to increase the concentration efficiency.

Figure 13:
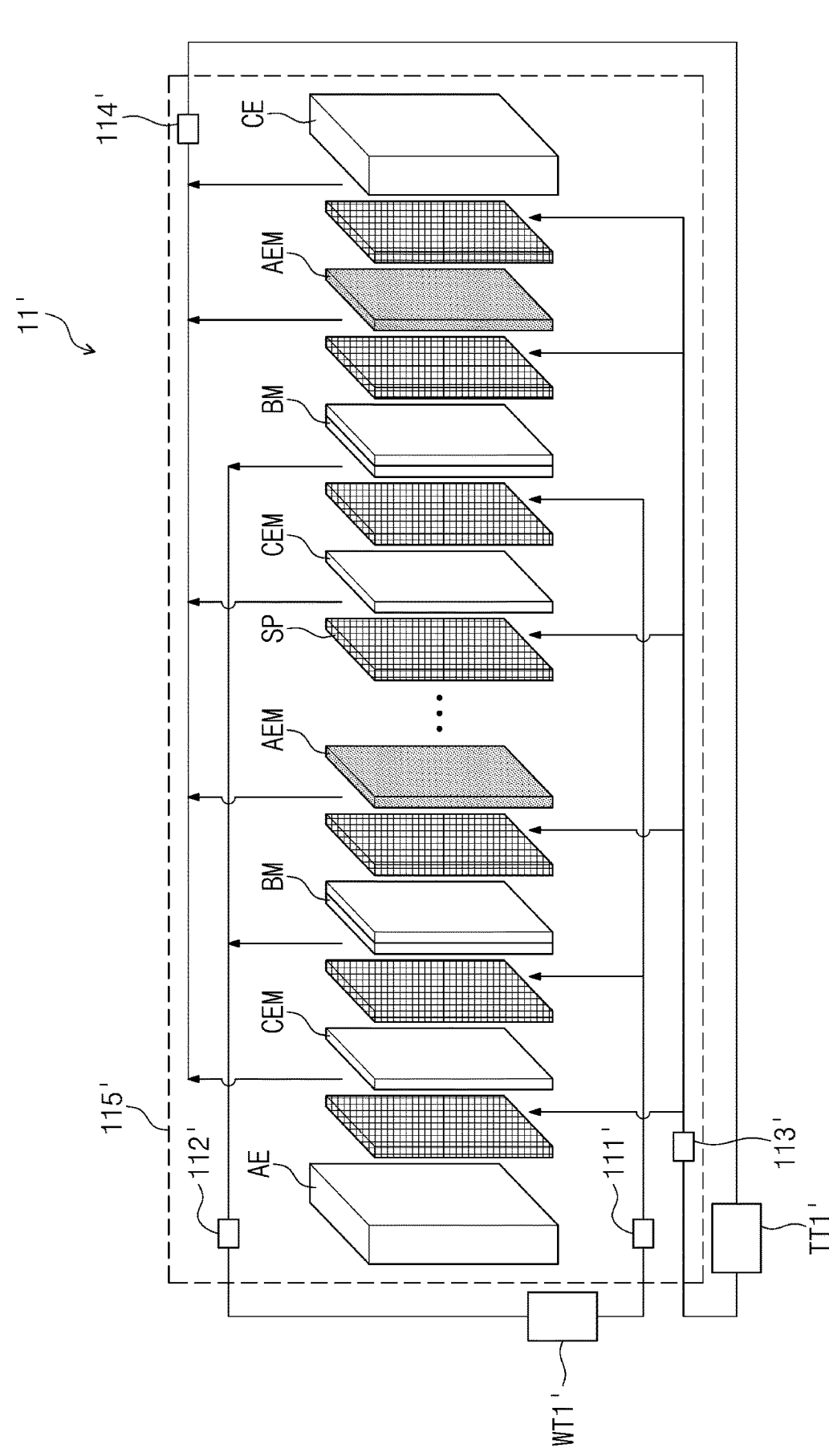
FIG. 13 illustrates a perspective view showing an inside of a chamber in an electrodialysis apparatus according to example embodiments of the present inventive concepts.

FIG. 13 illustrates a perspective view showing an inside of a chamber in an electrodialysis apparatus according to example embodiments of the present inventive concepts.

For convenience of description, the following will omit explanations of components substantially the same as or similar to those discussed with reference to FIGS. 1 to 12.

Referring to FIG. 13, a first chamber 11' may be provided. Different from that discussed with reference to FIG. 4, the first chamber 11' of FIG. 13 may further include an anion-exchange membrane AEM. For example, an electrodialysis apparatus of FIG. 13 may be a BP-A-C type electrodialysis apparatus, which includes a combination of bipolar membrane (BP), anion-exchange membrane (A), and cation-exchange membrane (C). The anion-exchange membrane AEM may be manufactured based on polystyrene or polyphenylene oxide (PPO) polymer support. For example, the anion-exchange membrane AEM may be made positively charged by amination of polystyrene or polyphenylene oxide (PPO) polymer support. In this case, a reinforcing fabric may be added to obtain stability to pH.

The bipolar membrane BM, the anion-exchange membrane AEM, and the cation-exchange membrane CEM may be disposed spaced apart from each other between the anode AE and the cathode CE, as illustrated. A spacer SP may be positioned between the bipolar membrane BM, the anion-exchange membrane AEM, and the cation-exchange membrane CEM, as illustrated. In example embodiments, the bipolar membrane BM, the anion-exchange membrane AEM, and the cation-exchange membrane CEM may each be provided in plural (i.e., multiple membranes). The plurality of bipolar membranes BM, the plurality of anion-exchange membranes AEM, and the plurality of cation-exchange membranes CEM may be disposed alternately and spaced apart from each other, as illustrated. The BP-A-C type electrodialysis apparatus may increase in concentration efficiency.

According to a wastewater treatment system and method for a semiconductor fabrication process in accordance with example embodiments of the present inventive concepts, wastewater may be concentrated to higher levels.

According to a wastewater treatment system and method for a semiconductor fabrication process in accordance with example embodiments of the present inventive concepts, wastewater may increase in concentration efficiency.

According to a wastewater treatment system and method for a semiconductor fabrication process in accordance with example embodiments of the present inventive concepts, it may be possible to reduce a process time and to cut down manufacturing costs.

Effects of the present inventive concepts are not limited to the mentioned above, other effects which have not been mentioned above will be clearly understood to those skilled in the art from the following description.

Although the present inventive concepts have been described in connection with example embodiments of the present inventive concepts illustrated in the accompanying drawings, it will be understood to those skilled in the art that various changes and modifications may be made without departing from the present inventive concepts. It therefore will be understood that the embodiments described above are just illustrative but not limitative in all aspects.

What is claimed is:

1. A wastewater treatment method for a semiconductor fabrication process, the method comprising:

processing wastewater discharged from a semiconductor process chamber to generate a wastewater with an increased solute concentration, comprising causing an ion exchange between the wastewater discharged from the semiconductor process chamber and a first treatment water in a first electrodialysis apparatus, wherein the wastewater discharged from the semiconductor process chamber repeatedly enters a chamber of the first electrodialysis apparatus directly from a wastewater tank via a wastewater inlet port and exits the chamber of the first electrodialysis apparatus directly back to the wastewater tank via a wastewater outlet port, and wherein the first treatment water repeatedly enters the chamber of the first electrodialysis apparatus directly from a first treatment water tank via a treatment water inlet port and exits the chamber of the first electrodialysis apparatus directly back to the first treatment water tank via a first treatment water outlet port, wherein the first electrodialysis apparatus comprises a bipolar membrane-anion-exchange membrane-cation-exchange membrane (BP-A-C) type electrodialysis apparatus in which a plurality of bipolar membranes, a plurality of anion-exchange membranes, and a plurality of cation-exchange membranes are alternately arranged with each other between an anode and a cathode of the first electrodialysis apparatus, wherein the wastewater discharged from the semiconductor process chamber is introduced into each of a plurality of spaces in contact with a surface of each of the plurality of cation-exchange membranes that is directed toward the cathode, and wherein the first treatment water is introduced into each of a plurality of spaces in contact with a surface of each of the plurality of cation-exchange membranes that is directed toward the anode and into each of a plurality of spaces in contact with a surface of each of the plurality of anion-exchange membranes that is directed toward the anode; and processing wastewater that comprises at least a portion of the wastewater with the increased solute concentration, comprising:

circulating the wastewater that comprises at least a portion of the wastewater with the increased solute concentration in a second electrodialysis apparatus;

circulating a second treatment water in the second electrodialysis apparatus;

causing an ion exchange between the second treatment water and the wastewater circulating in the second electrodialysis apparatus; and combining a portion of the wastewater circulating in the second electrodialysis apparatus with the second treatment water.

2. The wastewater treatment method of claim 1, wherein the combining the portion of the wastewater circulating in the second electrodialysis apparatus with the second treatment water comprises:

separating the wastewater circulating in the second electrodialysis apparatus into reconcentration-target wastewater and additional treatment water, and combining the additional treatment water with the second treatment water and circulating the combined additional treatment water and second treatment water in the second electrodialysis apparatus.

3. The wastewater treatment method of claim 2, wherein the separating the wastewater circulating in the second electrodialysis apparatus is performed when the wastewater circulating in the second electrodialysis apparatus is discharged from the second electrodialysis apparatus.

4. The wastewater treatment method of claim 1, further comprising separating the wastewater with the increased solute concentration into concentrated wastewater and residual wastewater, wherein the residual wastewater is used as the second treatment water in the circulating of the second treatment water in the second electrodialysis apparatus.

5. The wastewater treatment method of claim 1, wherein the processing the wastewater discharged from the semiconductor process chamber further comprises:

measuring a pH value of the first treatment water; and using the measured pH value of the first treatment water to determine whether the first treatment water requires replacing.

6. The wastewater treatment method of claim 5, wherein the determining whether the first treatment water requires replacing comprises determining whether the measured pH value of the first treatment water is less than a reference pH value.

7. The wastewater treatment method of claim 6, wherein the processing the wastewater discharged from the semiconductor process chamber further comprises replacing the first treatment water when the measured pH value of the first treatment water is equal to or less than the reference pH value.

8. A wastewater treatment method for a semiconductor fabrication process, the method comprising:

providing wastewater into a chamber of an electrodialysis apparatus, wherein the wastewater repeatedly enters the chamber of the electrodialysis apparatus from a wastewater tank via a wastewater inlet port and exits the chamber of the electrodialysis apparatus back to the wastewater tank via a wastewater outlet port;

providing treatment water into the chamber, wherein the treatment water repeatedly enters the chamber of the electrodialysis apparatus from a treatment water tank via a treatment water inlet port and exits the chamber of the electrodialysis apparatus back to the treatment water tank via a treatment water outlet port;

providing power to an anode and a cathode of the electrodialysis apparatus to cause an ion exchange between the wastewater and the treatment water in the chamber;

wherein the electrodialysis apparatus comprises a bipolar membrane-anion-exchange membrane-cation-exchange membrane (BP-A-C) type electrodialysis apparatus in which a plurality of bipolar membranes, a plurality of anion-exchange membranes, and a plurality of cation-exchange membranes are alternately arranged with each other between the anode and the cathode, wherein the wastewater is introduced into each of a plurality of spaces in contact with a surface of each of the plurality of cation-exchange membranes that is directed toward the cathode, and wherein the treatment water is introduced into each of a plurality of spaces in contact with a surface of each of the plurality of cation-exchange membranes that is directed toward the anode and into each of a plurality of spaces in contact with a surface of each of the plurality of anion-exchange membranes that is directed toward the anode;

separating the wastewater discharged from the chamber into reconcentration-target wastewater and additional treatment water via a connection tube that connects the wastewater tank to the treatment water tank such that a portion of the wastewater flows through the connection tube from the wastewater tank;

providing the reconcentration-target wastewater into the chamber; and providing both the treatment water discharged from the chamber and the additional treatment water into the chamber.

9. The wastewater treatment method of claim 8, wherein an amount of the reconcentration-target wastewater is greater than an amount of the additional treatment water.

10. The wastewater treatment method of claim 8, wherein a volume ratio between the wastewater and the treatment water provided into the chamber is about 1:5 to about 1:9.

11. The wastewater treatment method of claim 8, wherein the wastewater comprises tetramethylammonium hydroxide (TMAH).

12. The wastewater treatment method of claim 8, wherein a respective one of a plurality of spacers is positioned between each adjacent bipolar membrane and cation-exchange membrane, between each adjacent bipolar membrane and anion-exchange membrane, and between each adjacent anion-exchange membrane and cation-exchange membrane, and wherein each of the plurality of spacers comprises silicon.

* * * * *